US007415385B2

(12) United States Patent
Azarbayejani et al.

(10) Patent No.: US 7,415,385 B2
(45) Date of Patent: Aug. 19, 2008

(54) SYSTEM AND METHOD FOR MEASURING PERFORMANCES OF SURVEILLANCE SYSTEMS

(75) Inventors: Ali Azarbayejani, Boston, MA (US); Alexandre Alahi, Prilly (CH); Murat Erdem, Melrose, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 11/564,357

(22) Filed: Nov. 29, 2006

(65) Prior Publication Data

US 2008/0126031 A1 May 29, 2008

(51) Int. Cl.
*G06F 11/30* (2006.01)
(52) U.S. Cl. ...................................... 702/182; 702/179
(58) Field of Classification Search ................ 702/150, 702/179–185
See application file for complete search history.

(56) References Cited

U.S. PATENT DOCUMENTS 4,591,858 A * 5/1986 Jacobson .................... 342/169
5,850,516 A * 12/1998 Schneier ...................... 726/25
2002/0194469 A1* 12/2002 Dominique et al. ......... 713/150
2005/0182969 A1* 8/2005 Ginter et al. ................ 713/201
2005/0237390 A1* 10/2005 Mittal et al. ................ 348/169
2006/0190228 A1* 8/2006 Johnson ....................... 703/13

OTHER PUBLICATIONS

Schlogl et al. "Performance Evaluation Metrics for Motion Detection and Tracking", Aug. 23-26, 2004, Proceedings of the 17th International Conference on Pattern Recognition, 2004, vol. 4, pp. 519-522.*

Muller-Schneiders et al. "Performance Evaluation of Real Time Video Surveillance System", 15, Oct. 16, 2005, Proceedings. 2nd Joint IEEE International Workshop on Visual Surveillance and Performance Evaluation of Tracking and Surveillance, p. 137-143.*

* cited by examiner

*Primary Examiner*—Manuel L Barbee
(74) *Attorney, Agent, or Firm*—Dirk Brinkman; Clifton D. Mueller; Gene V. Vinokur

(57) ABSTRACT

A computer implemented method measures a performance of surveillance system. A site model, a sensor model and a traffic model are selected respectively from a set of site models, a set of sensor models, and a set of traffic models to form a surveillance model. Based on the surveillance model surveillance signals are generated. Performance of the surveillance system is evaluated according to qualitative surveillance goals and the surveillance signals to determine a value of a quantitative performance metric of the surveillance system.

17 Claims, 4 Drawing Sheets

10

20

SYSTEM AND METHOD FOR MEASURING PERFORMANCES OF SURVEILLANCE SYSTEMS

FIELD OF THE INVENTION

This invention relates generally to surveillance systems, and more particularly to measuring performances of autonomous surveillance systems.

BACKGROUND OF THE INVENTION

Surveillance System

A surveillance system acquires surveillance signals from an environment in which the system operates. The surveillance signals can include images, video, audio and other sensor data. The surveillance signals are used to detect and identify events and objects, e.g., people, in the environment.

As shown in FIG. 1, a typically prior art surveillance system 10 includes a distributed network of sensor 11 connected to a centralized control unit 12 via a network 13. The sensor network 11 can include passive and active sensors, such as motion sensors, door sensors, heat sensors, fixed cameras and pan-tilt-zoom (PTZ) cameras. The control unit 12 includes display devices, e.g., TV monitors, bulk storage devices such as VCRs, and control hardware. The control unit can process, display and store sensor data acquired by the sensor network 11. The control unit can also be involved in the operation of the active sensors of the sensor network. The network 13 can use an internet protocol (IP).

It is desired to measure the performance of a surveillance system, particularly where the control of the sensors is automated.

Scheduling

The scheduling of active sensors, such as the PTZ cameras, impacts the performance of surveillance systems. A number of scheduling policies are known. However, different scheduling policies can perform differently with respect to the performance goals and structure of the surveillance system. Thus, it is important to be able to measure the performance of surveillance systems quantitatively with different scheduling policies.

Surveillance System Performance

Typically, automated surveillance systems have been evaluated only with respect to their component processes, such as image-based object tracking. For example, one can evaluate the performance of moving-object tracking under varying conditions, including indoor/outdoor, varying weather conditions and varying cameras/viewpoints. Standard data sets are available to evaluate and compare the performance of tracking processes. Image analysis procedures, such as object classification and behavior analysis have also been tested and evaluated. However, because not all surveillance systems use these functions and because there is no standard of performance measure, that approach has limited utility.

Scheduling policies have been evaluated for routing a packet in a computer or communications network or scheduling a job in multitasking computers. Each packet has a deadline and each class of packets has an associated weight, and the goal is to minimize the weighted loss due to dropped packets (a packet is dropped if it is not served by the router before its deadline). However, in those applications, the serving time usually depends only upon the server, whereas in the surveillance case it depends upon the object itself. In the context of a video surveillance system, "packets" correspond to objects, e.g., people, which have different serving times based on their location, motion, and distance to the cameras. A "dropped packet" in a PTZ-based video surveillance system corresponds to an object departing a site before being observed at a high resolution by a PTZ camera. As a result, each object may have an estimated deadline corresponding to the time it is expected to depart the site. Thus, computer-oriented or network-oriented scheduling evaluation cannot directly be applied to the surveillance problem.

Surveillance scheduling policy can also be formulated as a kinetic traveling salesperson problem. A solution can be approximated by iteratively solving time-dependent orienteering problems. However, that would require the assumption that the paths of surveillance targets are known, or predictable with constant velocity and linear paths, which is unrealistic in practical applications. Moreover, it would require the assumption that the motion of a person being observed by a PTZ camera is negligible, which is not true if the observation time, or "attention interval," is long enough.

The ODViS system supports research in tracking video surveillance. That system provides researchers the ability to prototype tracking and event recognition techniques using a graphical interface, C. Jaynes, S. Webb, R. Steele, and Q. Xiong, "An open development environment for evaluation of video surveillance systems," IEEE Workshop on Performance Analysis of Video Surveillance and Tracking (PETS '2002), in conjunction with ECCV, June 2002. That system operates on standard data sets for surveillance systems, e.g., the various standard PETS video, J. Ferryman. "Performance evaluation of tracking and surveillance," Empirical Evaluation Methods in Computer Vision, December 2001.

Another method measures image quality for surveillance applications using image fine structure and local image statistics, e.g., noise, contrast (blur vs. sharpness), color information, and clipping, Kyungnam Kim and Larry S. Davis, "A fine-structure image/video quality measure using local statistics," ICIP, pages pp. 3535-3538, 2004. That method only operates on real video acquired by surveillance cameras and only evaluates image quality. That method makes no assessment of what is going in the underlying content of the video and the particular task that is being performed.

Virtual Surveillance

A system for generating videos of a virtual reality scene is described by W. Shao and D. Terzopoulos, "Autonomous pedestrians," Proc. ACM SIGGRAPH, Eurographics Symposium on Computer Animation, pp. 19-28, July 2005. That system uses a hierarchical model to simulate a single large-scale environment (Pennsylvania Station in New York City), and an autonomous pedestrian model. Surveillance issues are not considered. That simulator was later extended to include a human operated sensor network for surveillance simulation, F. Qureshi and D. Terzopoulos, "Towards intelligent camera networks: A virtual vision approach," Proc. The Second Joint IEEE International Workshop on Visual Surveillance and Performance Evaluation of Tracking and Surveillance, October 2005.

In later work, camera scheduling policies are described, still for the same single Pennsylvania station environment, F. Z. Qureshi and D. Terzopoulos, "Surveillance camera scheduling: A virtual vision approach," ACM International Workshop on Video Surveillance and Sensor Networks, 2005. There, the camera controller is modeled as an augmented finite state machine. In that work, the train station is populated with various number of pedestrians. Then, that method determines whether different scheduling strategies detect the pedestrians or not. They do not describe generalized quantitative performance metrics. Their performance measurement is specific for the single task of active cameras viewing each target exactly once.

It is desired to provide a general quantitative performance metric that can be applied to any surveillance systems, i.e., surveillance systems with networks of fixed cameras, manually controlled active cameras, automatically controlled fixed and active cameras, independent of post-acquisition processing steps, and that can be specialized to account for various surveillance goals.

SUMMARY OF THE INVENTION

The embodiments of the invention provide a computer implemented method for measuring a performance of a surveillance system. A site model, a sensor model and a traffic model are selected from a set of site models, a set of sensor models, and a set of traffic models to form a surveillance model. Based on the surveillance model, surveillance signals are generated simulation an operation of the surveillance system. Performance of the surveillance system is evaluated according to qualitative surveillance goals to determine a value of a quantitative performance metric of the surveillance system. Selecting a plurality of the surveillance models enables analyzing the performance of multiple surveillance systems statistically.

DETAILED DESCRIPTION OF THE PREFERRED EMBODIMENT

One embodiment of our invention provides a system and method for simulating, analyzing, and measuring a performance of a surveillance system. The surveillance system can include fixed cameras, pan-tilt-zoom (PTZ) cameras, and other sensors, such as audio, ultrasound, infrared, and motions sensors and can be manually or automatically controlled.

Our system generates simulated surveillance signals, much like the real world surveillance sensor network 11 would. The signals are operated on by procedures that evaluate object detection and tracking, evaluate action recognition, and evaluate object identification.

The signals can include video, images, and other sensor signals. The operation of the surveillance system can then be evaluated using our quantitative performance metric to determine whether the surveillance system performs well on various surveillance goals. By using this metric, the simulation can be used to improve the operation of a surveillance system, or to find optimal placement of sensors.

Another purpose of the embodiments of our invention is to rapidly evaluate a large number of surveillance systems, in a completely automatic manner, with different assumptions at a low cost, and yet provide meaningful results. Herein, we define a surveillance model as a combination of a site model, a traffic model and a sensor model selected from a set of site, traffic and sensor models. The site, traffic and sensor models are described below. Herein, we also define a set conventionally. Generally, a set has one or more members, or none at all.

System Structure

Figure 1:
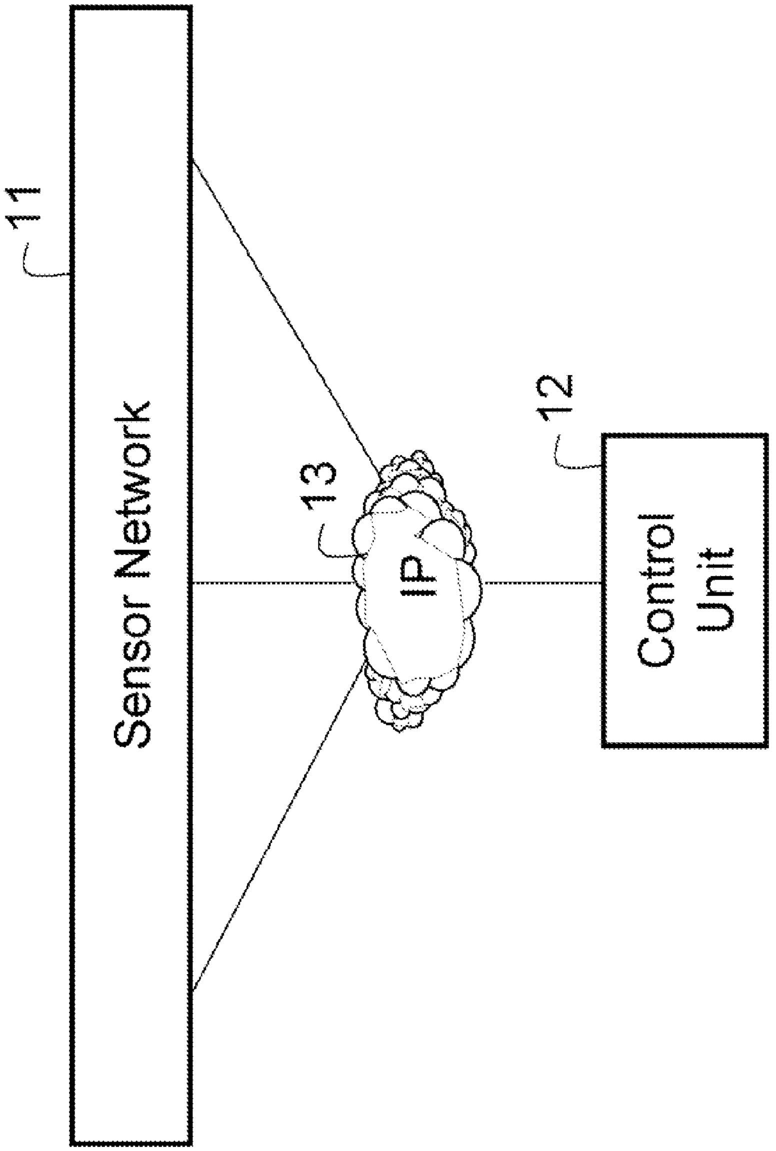
FIG. 1 Prior Art
FIG. 1 is a block diagram of a prior art surveillance system.
Figure 2:
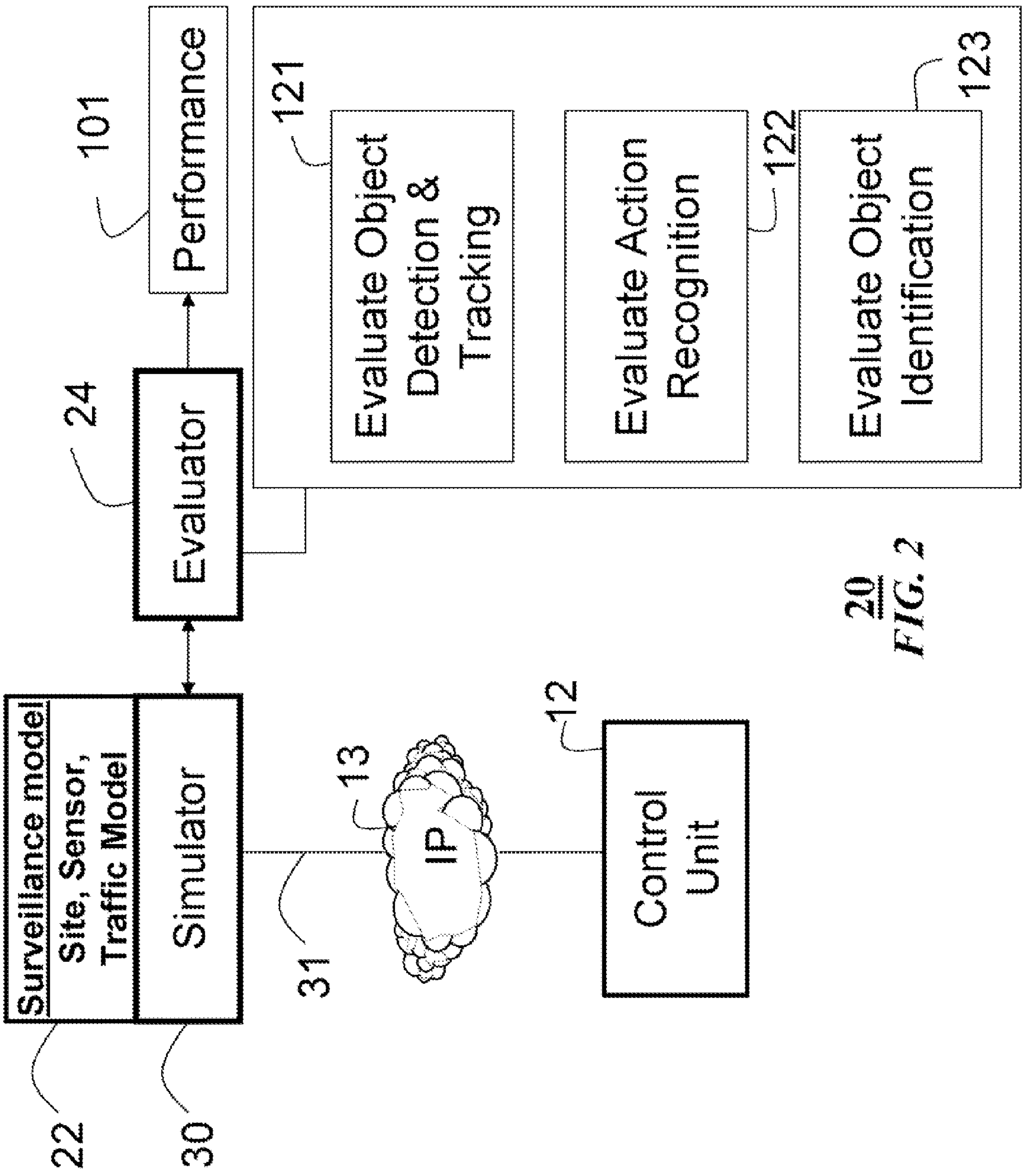
FIG. 2 is a block diagram of a method and system for measuring the performance of a surveillance system according to an embodiment of the invention.

FIG. 2 shows an embodiment of a system 20 for measuring a performance 101 of a surveillance system. The surveillance system includes a control unit 12 connected to a simulator 30 via a network 13. The simulator 30 generates surveillance signals that are similar to the signals that would be generated by the sensor network 11 of FIG. 1.

The simulator 30 has access to sets of surveillance models 22 including a set of site models, a set of sensor models, and a set of traffic models. The system also includes an evaluator 24.

Surveillance Models

In an embodiment of our invention, we simulate 30 an operation of a sensor network using selected surveillance models 22 to generate surveillance signals 31. The signals can include video, images, and other sensor signals.

The surveillance signals can be presented to the internet protocol (IP) network 13 using IP interfaces that are becoming the prominent paradigm in surveillance applications.

Our system allows us to evaluate 24 a large number of different surveillance system configurations automatically, under different traffic conditions, in a short time, and without having to invest in a costly physical plant, but using the models instead. This is done by selecting multiple instances of the surveillance models, each instance including a site, sensor and traffic model.

Site Model Set

Each site model represents a specific surveillance environment, e.g., a building, a campus, an airport, an urban neighborhood, and the like. In general, the site models can be in the form of 2D or 3D graphic models. The site model can be generated from floor plans, site plans, architectural drawings, maps, and satellite images. The site model can have an associated scene graph to assist the rendering procedures. In essence, the site model is a spatial description of where the surveillance system is to operate.

Sensor Model Set

Each sensor model represents a set of sensors that can be arranged in a site. In other words, a particular sensor model can be associated with a corresponding site model. The sensors can be fixed cameras, PTZ cameras, or other sensors, such as motion, door, audio, ultrasound, infrared, water, heat, and smoke sensors. Therefore, the sensor models indicate the type of sensors, their optical, electrical, mechanical, and data acquisition characteristics, and their locations. The sensors can be passive or active. Each sensor can also be associated with a set of scheduling policies. The scheduling policies indicate how and when sensors are used over time. For PTZ cameras, the models indicate how the cameras can be operated autonomously while detecting and tracking objects using the scheduling policies. A sensor can be evaluated for a selected one or more of the set of scheduling policies.

Scheduling Policies

Scheduling policies can be predictive or non-predictive.

Non-Predictive Policies

"Earliest Arrival" is also known as "First Come, First Served." This policy simply selects the next target based on earliest arrival time in the site. This policy implicitly pursues a goal of minimizing missed targets under the assumption that objects with earlier arrivals are likely have earlier departures. This temporal policy does not take into consideration any spatial information. Therefore, it cannot pursue minimizing traveling and could suffer from excess traveling.

A "Close to Far" policy is also known as "Bottom to Top," because a typical surveillance camera is positioned high on a wall or ceiling, looking horizontally and down, making ground objects close to the camera appear near the bottom of the image, and those far from the camera near the top. This policy selects die next target based on closest distance to the bottom border of the context image, which, under the assumed geometry, implies the closest object to the camera. This policy implicitly pursues an objective of minimizing missed targets under the assumed geometry, because closer objects traverses the field of view faster than far objects. Also, depending on the exact geometry, the top of the context image may, in fact, be a very unlikely or impossible location for departing targets to leave the context image.

A "Center to Periphery" is also known as "First Center." This policy selects the next target based on closest distance to the center of a context image taken by a wide angle camera. This policy implicitly pursues minimizing traveling cost under the assumption that most targets will be concentrated in the center of the image, or will move towards the center, which often is the center of interest at a particular location.

A "Periphery to Center" is also known as "Last Center." This policy selects the next target based on closest distance to the borders of the context image. This policy implicitly pursues minimizing missed targets under the assumption that targets near the borders are most likely to depart the site.

A "Nearest Neighbor" selects the next target based on closest distance to the current attention point of the PTZ camera. This policy explicitly pursues minimizing traveling.

A "Shortest Path" policy selects the next target based on an optimization that minimizes the overall time to observe all the targets in the site. This policy tries to reduce the overall traveling cost of the PTZ cameras supposing that targets do not move.

Predictive Policies

Whereas the non-predictive policies generally implicitly optimize surveillance goals under various assumptions, predictive policies tend to explicitly optimize these surveillance objectives. Predictive policies explicitly predict target departure times and PTZ traveling times to select the optimal target. For all of the following policies, each target's path is predicted for a number of time intervals in the future. Using these predicted paths along with the current pointing of the camera and the known speed of the camera, it is possible to predict where and when the PTZ camera can intersect a target path and where and when each target is expected to depart the site. These can be used to implement the following predicative scheduling policies.

An "Estimated Nearest Neighbor" policy pursues minimizing traveling similar to the "Nearest Neighbor" policy. However, instead of determining travel time using the current static locations of targets, this policy computes traveling times to each target using predicted target paths and speed of PTZ cameras. It selects the next target based on shortest predicted traveling time.

An "Earliest Departure" policy pursues minimizing missed targets explicitly by using predicted departure times from the predicted target paths. It selects the next target based on earliest predicted departure time.

A "Conditional Earliest Departure" policy is similar to the "Earliest Departure" policy except that this policy also considers the traveling time of the PTZ camera to the target, and will skip a target if it predicts the PTZ camera will miss the target.

Traffic Model Set

Each traffic model represents a set of objects in a site. The objects are associated with types, e.g., people, cars or equipment. The objects can be static, or moving. In the later case, the objects can be associated with trajectories. The trajectories indicate paths of the objects, the speed of the objects, and their time of arrival and departure at particular locations. The traffic models can be generated by hand, automatically, or from historical data, e.g., surveillance video of a site.

Simulator

The simulator 30 generates the surveillance signals using instances of selected surveillance models. As stated above, each instance includes a site, sensor and traffic model. The simulator can apply computer graphics and animation tools to the selected models to generate the signals. The surveillance signals can be in the form of sequences of images (video) or other data signals consistent with the site, sensor and traffic models. After the models have been selected the simulator operates completely automatically.

Evaluator

The evaluator 24 analyses the performance of the surveillance signals system to determine values of a performance metric as describe below.

Method Operation

The system simulates an operation of the surveillance system 20 by selecting specific instances of the models 22. To do this, the simulator generates the output video for the sensors that are modeled as cameras, and perhaps, detected events for other sensors, e.g., motion activity in local area.

To perform the generation, the simulator can use conventional computer graphic and animation tools. For a particular camera, the simulator renders a scene as a video, using the site, sensor, and traffic models.

Our rendering techniques are similar to conventional techniques used in video games and virtual reality applications, which allow a user interact with a computer-simulated environment. Similar levels of photorealism can be attained with our simulator. In a simplistic implementation, people can be rendered as avatars, more sophisticated implementation can render identifiable "real" people, and recognizable objects using, perhaps, prestored video clips.

Figure 3:
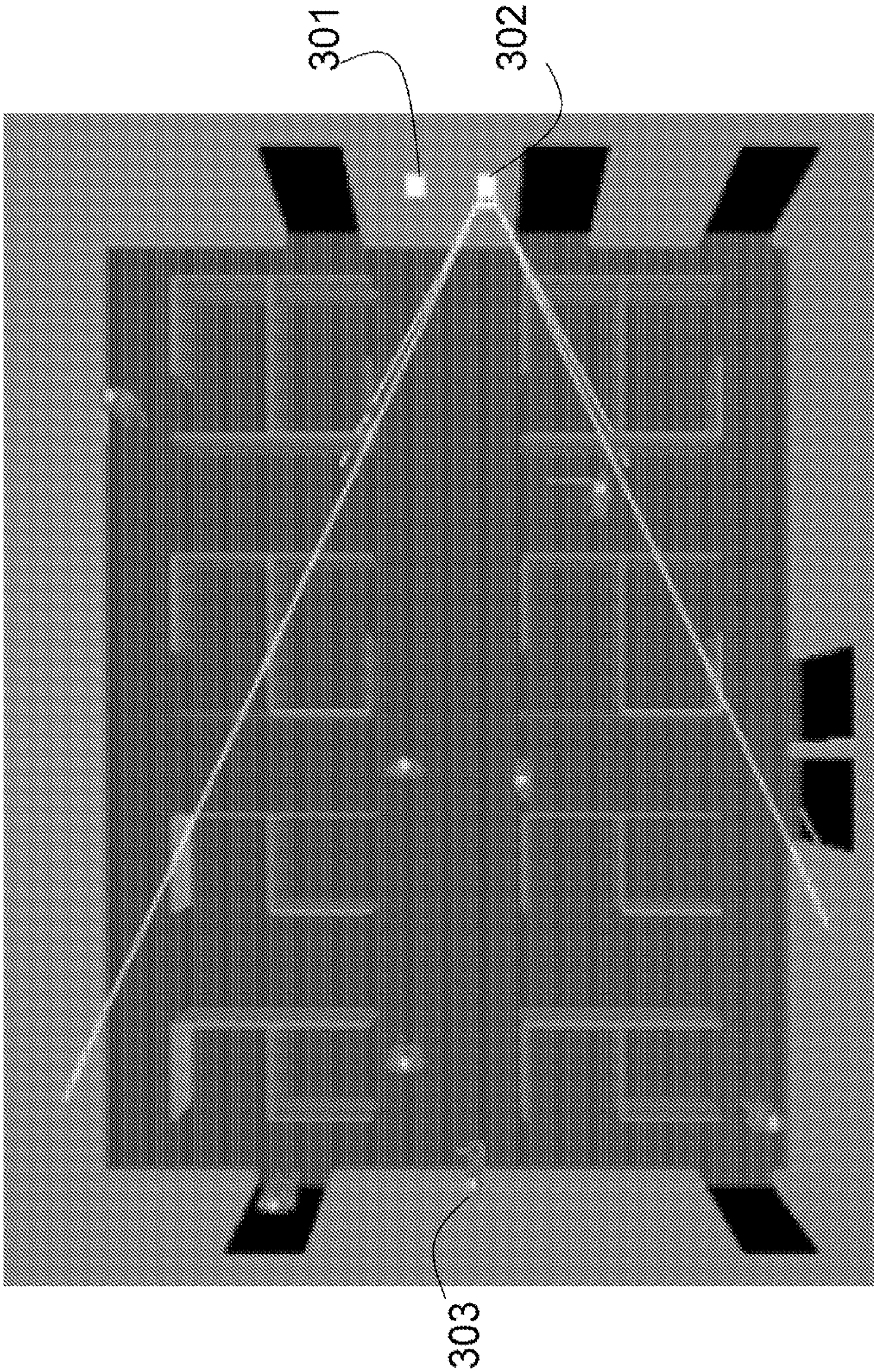
FIG. 3 is a top view of an environment under surveillance.
Figure 4:
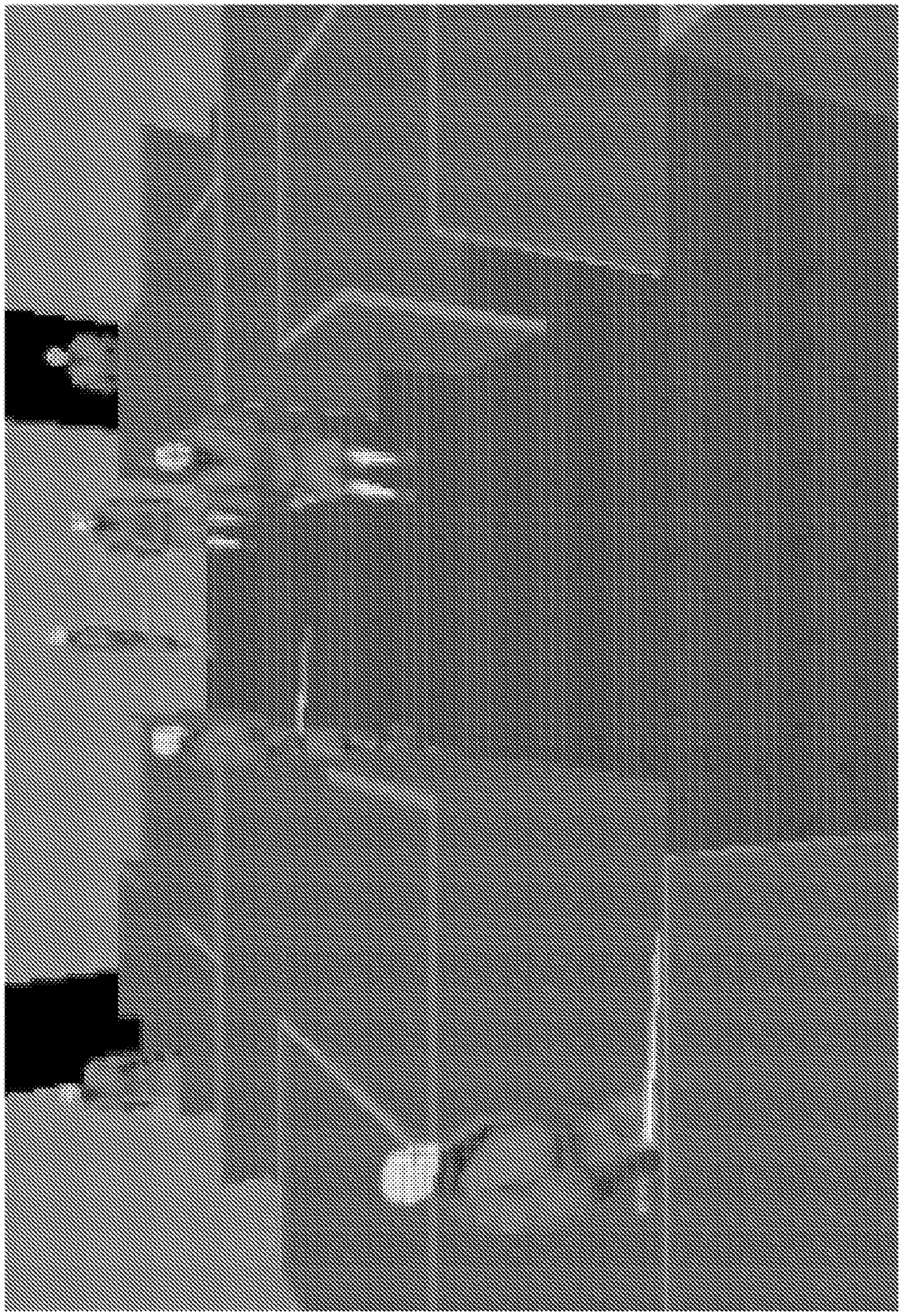
FIG. 4 is an example image generated by the system according to an embodiment of the invention for the environment of FIG. 3.

FIG. 3 is an overhead image of a site with a fixed camera 301 with a wide FOV, a PTZ camera 302, and targets 303. FIG. 4 shows an image for the fixed camera for the site shown in FIG. 3. In one embodiment, the avatars are rendered as green bodies with yellow heads against a grayish background to facilitate the detecting and tracking procedures.

Performance Goals

One of the goals of our system is to enable a user to better understand relevant events and objects in an environment. For example, a surveillance system should enable a user to learn the locations, activities, and identity of people in an environment.

In qualitative terms, if a surveillance system can meet its goals completely, then the system is fully successful. It would be useful to have a quantitative metric of how the system meets predetermined qualitative performance goals. In other words, it will be useful to translate qualitative notions of successful performance into a quantitative metric of successful performance. This is what our system does.

As shown in FIG. 2, we evaluate the performance goal (and functions) of our surveillance system using the following subgoals;

a. Knowing where each person is. (object detection and tracking) 121;

b. Knowing what each person is doing (action recognition) 122; and c. Knowing who each person is (object identification) 123.

The overall system performance 101 can be considered to be a weighted sum of individual performance metrics for the above subgoals $$\prod = \sum_{g \in G} \alpha_g \prod_g, \quad (1)$$

where $\pi$~Performance; $\pi \epsilon [0, 1]$

G~Set of all Goals $\alpha_g$~Performance for Goal 'g'; $\pi_g \epsilon [0,1]$ $\alpha_g$~Weight for Goal 'g'; $\alpha_g \geqq 0$, $\Sigma_{g \epsilon G} \alpha_g = 1$ The weights can be equal. In this case, the overall performance is an average of the performances. For the three surveillance goals listed above, the goal set is $$G \equiv \{\text{track, action, id}\},$$

and we define the quantitative performance metrics as $\pi_{track}$, $\pi_{action}$, and $\pi_{id}$.

Notions used below include:

T~Set of all discrete time instances in a scenario t~A discrete time instance ($t \epsilon T$)

X~Set of all targets in a scenario $\chi$~A target ($\chi \epsilon X$)

C~Set of all cameras in the video surveillance system c~A camera ($c \epsilon C$)

Generally, not all targets are present in the site all of the time. The surveillance system is only responsible for targets in the site. Therefore, we define a target presence function $$\sigma(x, t) = \begin{cases} 1 & \text{if target '}x\text{' is present at time '}t\text{'} \\ 0 & \text{otherwise} \end{cases}, \quad (2)$$

and opportunities

O~Set of all opportunities (x,t) to view a target, $$\{(\chi,t) | \chi \epsilon X, t \epsilon T, \sigma(\chi,t)=1\}, \quad (3)$$

which are a subset of all target-time pairs $$O \subseteq X \times T.$$

Relevant Pixels

In one embodiment of the invention, the quantitative metric is "relevant pixels." We define the relevant pixels as the subset of pixels that contribute to an understanding of objects and events in acquired surveillance signals. For example, to identify a person using face recognition, relevant pixels are the pixels of the face of the person. This requires that the face be in a field of view of the camera, and that a plane of the face is substantially coplanar with the image plane of the camera. Thus, an image of a head facing away from camera does not have any relevant pixels. To locate a person, perhaps all pixels of the body are relevant, pixels in the background portion are not. The definition of relevant pixels may vary from goal to goal, as described below. In general, relevant pixels are associated with a target in an image taken by one of the cameras.

For each subgoal, we specify a likelihood function that expresses the probability that the subgoal can be met for a particular target at a particular instance in time, i.e., a single image, as a function of relevant pixels. In general, if no relevant pixels are acquired, the likelihood is zero. The likelihood increases with number of relevant pixels and eventually approaches unity.

There may be a non-zero minimum number of pixels before a goal has any realistic chance of being achieved. Also, there is a point of diminishing returns in which increasing the number of relevant pixels does not improve the probability of success. Thus, the likelihood versus relevant pixels is flat at zero to some minimum number of pixels $n_{min}$, then increases to unity at some maximum number of pixels $n_{max}$ and remains flat at unity thereafter. Such a linear likelihood function can have a form $$L(n) = P(g \mid n) = \begin{cases} 0 & 0 \le n \le n_{\min} \\ (n - n_{\min}) / (n_{\max} - n_{\min}) & n_{\min} \le n \le n_{\max} \\ 1 & n_{\max} \le n \end{cases}, \quad (4)$$

where g~Goal n~Number of relevant pixels; $n \geqq 0$

P(g|n)~Likelihood of 'n'; i.e. probability of achieving 'g' given 'n'

If $n_{min} = n_{max}$, then the likelihood function is a step function.

Quantitative Performance Metric and Qualitative Goals

We now describe our quantitative performance metrics in greater detail. Typically, a large number of simulations are performed, which can be evaluated statistically. Prior art surveillance systems do no have this capability of automatically evaluate a large number of different surveillance systems.

Evaluation

As stated above the evaluation of the performance of a surveillance system uses synthetic or real surveillance signals.

Evaluating Object Detection and Tracking

A 3-D location of a target is initially detected when its 2-D location is determined in one image. Tracking performance for one target, at one time in one camera is quantified in terms of number of pixels required to track a target. These are the relevant pixels. Using the above defined notation:

$$L_{track}(n(\chi,t,c)) \quad (5)$$

as in Equation 4 with $n_{min}$=Minimum number of pixels required for tracking $n_{max}$=Maximum number of pixels required for tracking, where $\chi$~Target t~Time c~Camera $n(\chi,t,c)$~Number of pixels of target 'x' camera 'c' at time 't'

The likelihood function is evaluated for each camera for each opportunity. The performance metric is the normalized sum over all opportunities of the maximum over all cameras of the tracking likelihood function. In our notation, $$\prod_{track} = \frac{1}{|O|} \sum_{(x,t) \in O} \max_{c \in C} L_{track}(n(x, t, c)). \quad (6)$$

In words, each opportunity the system has to observe a target, i.e., each discrete time that the target is present in the site, the number of pixels of that target in each camera is used to determine the likelihood of tracking the target from the camera. The overall likelihood of tracking the target is taken as the maximum likelihood over all cameras. This maximum likelihood is summed over all "opportunities" and this sum is normalized by the total number of opportunities to obtain the performance metric. Note that $$\pi_{track} \in [0,1].$$

Evaluating Action Recognition

For action recognition, a higher resolution is required than for tracking and each target from multiple angles is viewed so that the entire surface of the target is acquired. We define a surface-coverage function $$s(x, t, c, \theta) = \begin{cases} 1 & \text{Target '}x\text{', surface at Angle '}\theta\text{' visible in Camera '}c\text{' at Time '}t\text{'} \\ 0 & \text{otherwise} \end{cases}.$$

If the target is a person, then the target can be modeled as a vertical cylinder for the purpose of object detection. In one embodiment, cameras are mounted on walls or ceilings with generally a horizontal view of the people, each vertical line on the cylindrical surface is typically completely visible in a camera or completely invisible. Thus, each such line, by its angle in the horizontal plane θ, is defined, and then, for each surface location and each camera, whether the surface is viewable by that camera is determined.

In order to determine this, a surface-coverage function is used, which computes its answer by drawing a line from the surface point to each camera center of projection, and determines whether that line falls in the field of view of that camera. When simulating surveillance, there are many ways for determining exactly how much of each target's surface is covered by cameras. However, for the purposes of developing a simple formulation for performance, a cylindrical model is used, but others could also be applied.

The performance metric for action recognition can then be expressed as $$\prod_{action} = \frac{1}{|O|} \sum_{(x,t)\in O} \frac{1}{2\pi} \int_0^{2\pi} d\theta \max_{c\in C}(L_{action}(n(x, t, c))g(x, t, c, \theta)), \tag{7}$$

where $L_{action}$ is similar to $L_{track}$, but with higher $n_{min}$ and $n_{max}$.

Evaluating Object Identification

In one embodiment of the invention, people are identified by a face recognition subsystem. Typically, minimum requirements for face recognition include a relatively high resolution set of pixels of the face with the face oriented within a limited range of pose with respect to the camera.

For the resolution, we can use a relevant pixel likelihood function, $L_{id}$, following Equation 4, in which $n_{min}$ and $n_{max}$ are higher than those for $L_{action}$ and higher again than those for $L_{track}$. The relevant pixels are only of the face of the target person, not the rest of the body as for tracking and action recognition. Thus, the required resolution is actually much higher than that required for tracking or action.

A pose function is defined as $$\Phi(x, t, c) = \begin{cases} 1 - \phi/\phi_{max} & |\phi| \le \phi_{max} \\ 0 & |\phi| > \phi_{max} \end{cases},$$

where $\phi$~Pose angle from ideal pose $\phi_{max}$~Maximum $\phi$ allowing face recognition A performance metric for identification by face recognition is expressed as $$\prod_{id} = \frac{1}{|X|} \sum_{x\in X} \max_{\{t\in T|\sigma(x,t)=1\}} \max_{c\in C}(L_{id}(n(x, t, c))\Phi(x, t, c)). \tag{8}$$

In words, the total metric is the sum of a metric for each target, normalized by the number of targets. Each target, in principle, only requires one good image to be identified, so we use the best one, defined by the highest product of the resolution measure ($L_{id}$) and the pose measure ($\Phi$) over all cameras over all discrete times at which the target is present in the site.

Lighting, occlusion, and facial expression also contribute to the success of face recognition. Therefore, in practice, having multiple views of each person is beneficial.

The performance metric is adjusted to reflect these realities in different embodiments, but in this particular embodiment we use the slightly idealized metric requiring just one good picture per person.

Overall Performance

The performance of the surveillance system can be evaluated individually for the component performance goals or in aggregate for overall performance. The overall relevant pixel performance metric, with equal weighting, is an average of the three performance metrics $$\prod = \frac{1}{3}\left(\prod_{track} + \prod_{action} + \prod_{id}\right).$$

Other weightings can be applied in different embodiments, depending on surveillance scenario and performance goals. For example, for testing, involving evaluation and comparison of scheduling policies, we limit our simulations to those in which all targets are always trackable in all cameras. Therefore, we evaluate $\pi_{action}$ and $\pi_{id}$ individually, with respect to various PTZ schedules.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A computer implemented method for measuring a performance of a surveillance system, comprising the steps of:

selecting a site model, a sensor model and a traffic model respectively from a set of site models, a set of sensor models, and a set of traffic models to form a surveillance model;

generating surveillance signals using the surveillance model, in which the surveillance signal includes a sequence of images;

determining a quantitative performance metric for each surveillance goal in a set of qualitative surveillance goals, in which the quantitative performance metric is a number of relevant pixels in the sequence of images, and in which the relevant pixels are associated with a target object in the sequence of images, and in which the qualitative performance goals include an object detection and tracking subgoal, an action recognition subgoal, and an object identification subgoal, and a likelihood function expresses a probability that the subgoal can be met for the target object at a particular instance in time as a function of the number of relevant pixels, in which the likelihood function has a form $$L(n) = P(g \mid n) = \begin{cases} 0 & 0 \le n \le n_{\min} \\ (n - n_{\min})/(n_{\max} - n_{\min}) & n_{\min} \le n \le n_{\max} \\ 1 & n_{\max} \le n \end{cases},$$

where n is the number of pixels, g is a subgoal, $n_{min}$ is a minimum number of relevant pixels, and $n_{max}$ is a maximum number of pixels;

measuring a value for each of the quantitative performance metrics using the surveillance signals; and evaluating a performance of the surveillance system according to the values of the quantitative performance metrics measured from the surveillance signals.

2. The method of claim 1, further comprising:

forming a plurality of the surveillance models, performing automatically the generating, and the measuring steps for each surveillance model in the plurality of the surveillance models to determine a plurality of the values; and analyzing statistically the plurality of the values.

3. The method of claim 2, in which a particular instance of the site model is selected for evaluation with a plurality of instances of the sensors models and a plurality of instances of the traffic models.

4. The method of claim 2, in which the selecting is automated.

5. The method of claim 1, in which each site model is a spatial description of where the surveillance system is to operate.

6. The method of claim 1, in which each sensor model specifies a set of sensors, and in which the set of sensors includes a fixed camera and an active camera.

7. The method of claim 6, in which each sensor is associated with a set of scheduling policies.

8. The method of claim 7, in which the set of scheduling policies include predictive and non-predictive scheduling policies.

9. The method of claim 1, in which each traffic model includes a set of objects, and each object having a type and a trajectory.

10. The method of claim 1, in which the generating applies computer graphics and animation techniques to the surveillance model to generate the surveillance signals used for measuring the quantitative performance metrics.

11. The method of claim 1, in which the surveillance signals include signals acquired from a real world surveillance system.

12. The method of claim 1, in which the qualitative performance goals include an object detection and tracking subgoal, an action recognition subgoal, and an object identification subgoal.

13. The method of claim 12, in which each qualitative subgoal is associated with a corresponding quantitative performance metric for the qualitative subgoal.

14. The method of claim 13, in which the evaluating step weights the values of the quantitative performance metrics for the subgoals.

15. The method of claim 13, in which the performance of the surveillance system is a weighted average of values of the corresponding quantitative performance metrics for the qualitative subgoals.

16. A computer implemented method for measuring a performance of a surveillance system, comprising the steps of:

obtaining surveillance signals of a surveillance system, wherein the surveillance signals includes a sequence of images;

determining a quantitative performance metric for each surveillance goal in a set of qualitative surveillance goals, wherein the quantitative performance metrics are based on a number of relevant pixels in the sequence of images;

measuring a value for each of the quantitative performance metrics using the surveillance signals, wherein a likelihood function expresses a probability that the surveillance goal in a set of qualitative surveillance goals can be met and has a form $$L(n) = P(g \mid n) = \begin{cases} 0 & 0 \le n \le n_{\min} \\ (n - n_{\min})/(n_{\max} - n_{\min}) & n_{\min} \le n \le n_{\max} \\ 1 & n_{\max} \le n \end{cases},$$

where n is the number of pixels, g is a surveillance goal, $n_{min}$ is a minimum number of relevant pixels, and $n_{max}$ is a maximum number of pixels; and evaluating a performance of the surveillance system according to the values of the quantitative performance metrics.

17. The method of claim 16, wherein the set of qualitative surveillance goals includes an object detection and tracking goal, an action recognition goal, and an object identification goal.

* * * * *